(12) United States Patent
Brockway

(10) Patent No.: US 9,365,996 B2
(45) Date of Patent: Jun. 14, 2016

(54) DIMENSIONAL WHEEL BODY FOR A COMPACTION MACHINE

(71) Applicant: Terra Compactor Wheel Corp., Sheboygan, WI (US)

(72) Inventor: Robert John Brockway, Plymouth, WI (US)

(73) Assignee: Terra Compactor Wheel Corp., Sheboygan, WI (US)

( * ) Notice: Subject to any disclaimer, the term of this patent is extended or adjusted under 35 U.S.C. 154(b) by 0 days.

(21) Appl. No.: 14/514,490

(22) Filed: Oct. 15, 2014

(65) Prior Publication Data

US 2016/0108595 A1   Apr. 21, 2016

(51) Int. Cl.
*E02D 3/02*   (2006.01)
*E01C 19/23*  (2006.01)
*A01B 29/04*  (2006.01)
*E02D 3/026*  (2006.01)

(52) U.S. Cl.
CPC .............. *E02D 3/0265* (2013.01); *A01B 29/04* (2013.01); *E01C 19/23* (2013.01); *E02D 3/02* (2013.01); *E02D 3/026* (2013.01)

(58) Field of Classification Search
CPC ....... E02D 3/026; E02D 3/039; B60B 15/021; B60C 7/24; B60C 7/102
See application file for complete search history.

(56) References Cited

U.S. PATENT DOCUMENTS

| | | | | |
|---|---|---|---|---|
| 322,567 | A * | 7/1885 | Stonesiper | 172/554 |
| 895,230 | A * | 8/1908 | Beier | 172/554 |
| 1,043,239 | A * | 11/1912 | Lee | 404/124 |
| 1,658,623 | A * | 2/1928 | Wittkopp | 152/300 |
| 2,261,893 | A * | 11/1941 | Wolfard | 404/124 |
| 5,154,490 | A * | 10/1992 | Burns | 301/44.3 |
| 5,795,097 | A * | 8/1998 | Caron et al. | 404/121 |
| 6,095,717 | A * | 8/2000 | Kaldenberg et al. | 404/121 |
| 2007/0280783 | A1 * | 12/2007 | Gibbins | 404/124 |
| 2012/0082513 | A1 * | 4/2012 | Springer | 404/121 |
| 2012/0213586 | A1 * | 8/2012 | Ugru | 404/121 |
| 2012/0312567 | A1 * | 12/2012 | Ugru | 172/108 |

* cited by examiner

*Primary Examiner* — Abigail A Risic
(74) *Attorney, Agent, or Firm* — Ziolkowski Patent Solutions Group, SC

(57) ABSTRACT

A compactor wheel for reducing the amount of material build-up, providing sufficient tractive forces, and effectively holding loose debris to prevent fly-away is disclosed. The compactor wheel includes a hub mountable to an axle of a compaction machine and a rim mounted around an outer circumference of the hub, with the rim including a wrapper having an inner circumferential edge and an outer circumferential edge. The compactor wheel also includes a plurality of cleat pads formed on the wrapper that each extend axially outward from the wrapper, with the plurality of cleat pads being spaced apart from one another on the wrapper such that a valley is formed between each adjacent pair of cleat pads. A plurality of cleats is affixed to each of the plurality of cleat pads and extends radially outward therefrom.

18 Claims, 11 Drawing Sheets

DIMENSIONAL WHEEL BODY FOR A COMPACTION MACHINE

BACKGROUND OF THE INVENTION

The invention relates generally to compaction machines, such as those used to compact landfills and, more particularly, to a compactor wheel on such a compaction machine, with the compactor wheel designed to provide consistent static ground pressure to force mud and other adhesive materials free of the wheel body, while constricting and holding loose debris so as to reduce fly-away debris.

Compaction machines are used to compact landfill sites, garbage dumps and other such locations. These machines typically include a self-propelled vehicle having four large compactor wheels made of steel. Each compactor wheel has a hub mounted to one end of an axle and a rim disposed around and radially out from the hub. The rim typically includes an outer wrapper on which a plurality of cleats is usually mounted. The design of conventional compactor wheels varies widely, but in general a compactor wheel is designed to compress (i.e., compact) the waste by concentrating the weight of the compaction machine on the relatively small area of the cleats and to break apart waste by imparting breaking forces thereon.

While existing compactor wheel designs are generally sufficient for compacting waste, there are recognized shortcomings with existing compactor wheels. An example of one problem encountered with existing compactor wheel designs is that material can build-up on the wheel over time. That is, as the compactor wheel traverses the surface of the landfill and waste is compressed by the wheel, mud and other adhesive materials may build-up on the wheel body and about the cleats. Such accumulation of material on the compactor wheel is undesirable, as it minimizes the efficiency of the wheel with respect to its ability to impart compression and breaking forces on the waste being compacted and to provide traction to the compaction machine.

Another problem encountered with existing compactor wheel designs is that, depending on the material/surface being traversed, the design of the compactor wheel may not provide sufficient traction to the compaction machine. That is, in some instances, the tractive depth of the cleats—i.e., the height that the cleats extend from the wheel body—may not be great enough so as to provide sufficient traction for the compactor wheel, as may occur when the material/surface being traversed is exceedingly pliant/spongy.

Still another problem encountered with existing compactor wheel designs is that loose waste, such as paper and lightweight plastics, may be prone to flying away from and off of the compactor wheel. That is, as the design of the compactor wheel does not provide an effective manner of folding, constricting and holding loose debris, such debris may fly away from the compactor wheel after compaction thereby.

It would therefore be desirable to have a compactor wheel that minimizes the build-up of material thereon, provides sufficient traction for the compaction machine, and reduces the likelihood of fly-away debris.

BRIEF DESCRIPTION OF THE INVENTION

Embodiments of the invention provide a compactor wheel configured to reduce the amount of material build-up on the compactor wheel, provide sufficient tractive forces, and effectively hold loose debris to prevent fly-away.

In accordance with one aspect of the invention, a compactor wheel mountable on an axle of a compaction machine includes a hub mountable to an axle of a compaction machine and a rim mounted around an outer circumference of the hub, with the rim including a wrapper having an inner circumferential edge and an outer circumferential edge. The compactor wheel also includes a plurality of cleat pads formed on the wrapper that each extend axially outward from the wrapper, with the plurality of cleat pads being spaced apart from one another on the wrapper such that a valley is formed between each adjacent pair of cleat pads. A plurality of cleats is affixed to each of the plurality of cleat pads and extends radially outward therefrom.

In accordance with another aspect of the invention, a dimensional compactor wheel includes a hub mountable to an axle of a compaction machine, a tapered rim mounted on the hub with a wrapper having an inner circumferential edge and an outer circumferential edge, and a plurality of cleat pads formed on the wrapper and each extending axially outward from the wrapper, the plurality of cleat pads being spaced apart from one another on the wrapper such that a valley is formed between each adjacent pair of cleat pads. The dimensional compactor wheel also includes a plurality of cleats affixed to each of the plurality of cleat pads and extending radially outward therefrom. Each of the plurality of cleat pads of the dimensional compactor wheel is formed so as to have a tapered thickness such that a distance which the cleat pad extends axially outward from the wrapper varies along a length of the cleat pad.

In accordance with yet another aspect of the invention, a dimensional compactor wheel includes a hub mountable to an axle of a compaction machine and a rim mounted on the hub that includes a wrapper formed on an outer surface of the rim, the wrapper having an inner circumferential edge and an outer circumferential edge. The dimensional compactor wheel also includes a plurality of cleat pads formed on the wrapper and each extending axially outward from the wrapper, wherein each of the plurality of cleat pads extends along the wrapper between the outer circumferential edge and the inner circumferential edge, with each cleat pad extending at angle across the wrapper from the outer circumferential edge to the inner circumferential edge. The dimensional compactor wheel further includes a plurality of cleats affixed to each of the plurality of cleat pads and extending radially outward therefrom.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
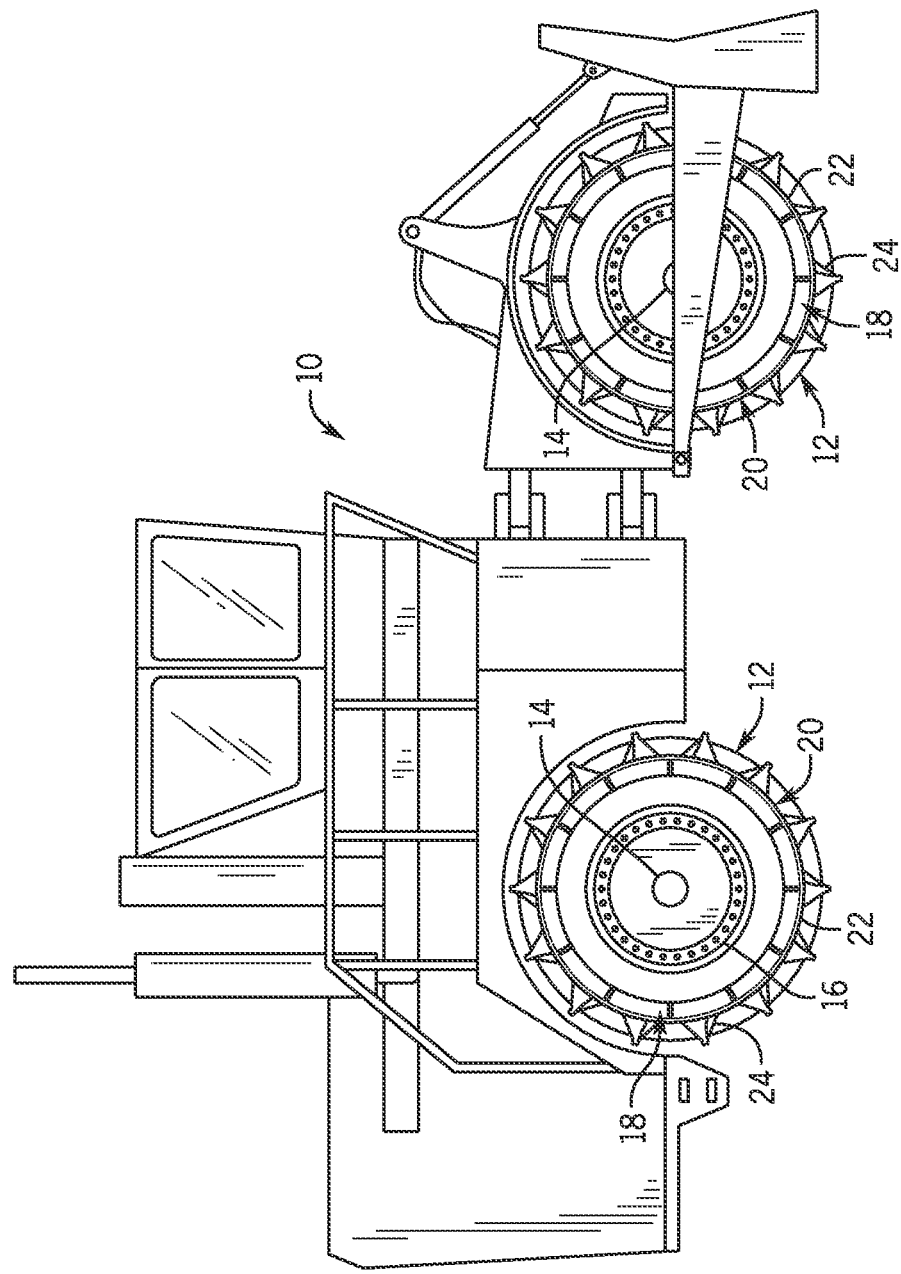
FIG. 1 is a side view of a compaction machine having compactor wheels mounted thereon for use with embodiments of the invention.

Referring to FIG. 1, a compaction machine 10 on which embodiments of the invention may be employed is shown. The present invention is not intended to be limited to any particular type of compaction machine 10 and may be used on any suitable compaction machine. In general, the compaction machine 10 includes compactor wheels 12 mounted on axles 14 of the compaction machine, with the wheels 12 including a hub 16 adapted, for example, with a plurality of bolt holes for being bolted or otherwise mounted to the axle 14. A rim 18 is mounted around the hub 16, with the rim 18 including a wrapper 20 having an outer face or surface 22 that faces and makes contact with a surface that is traversed by the compaction machine. A plurality of cleats 24 (i.e., teeth) are mounted on the compactor wheels, such as by welding or any other suitable technique, with the cleats 24 being mounted in any of a variety of patterns, as desired, such as being aligned in a plurality of rows, for example.

Figure 2:
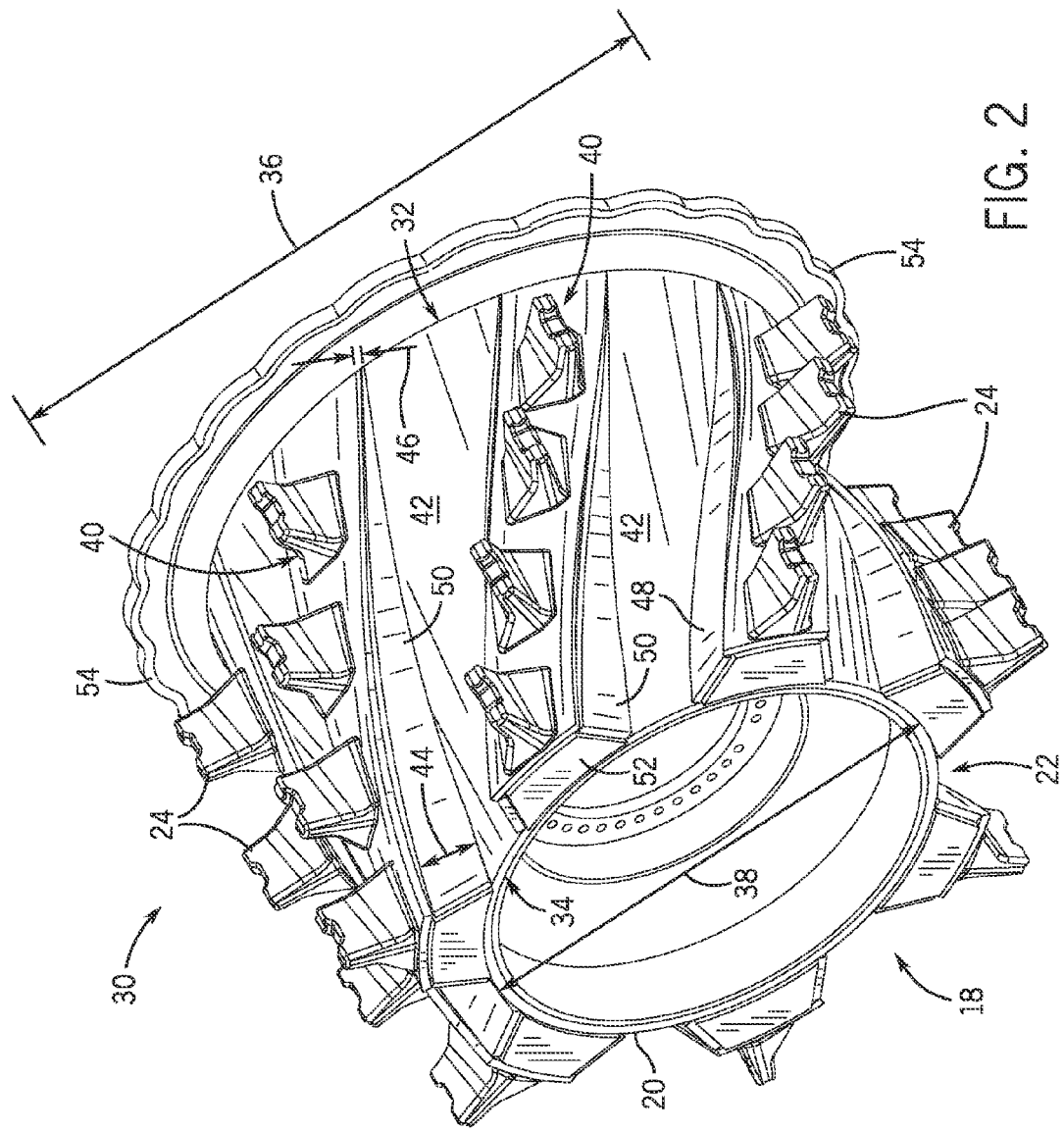
FIG. 2 is a perspective view of a compactor wheel according to an embodiment of the invention.
Figure 3:
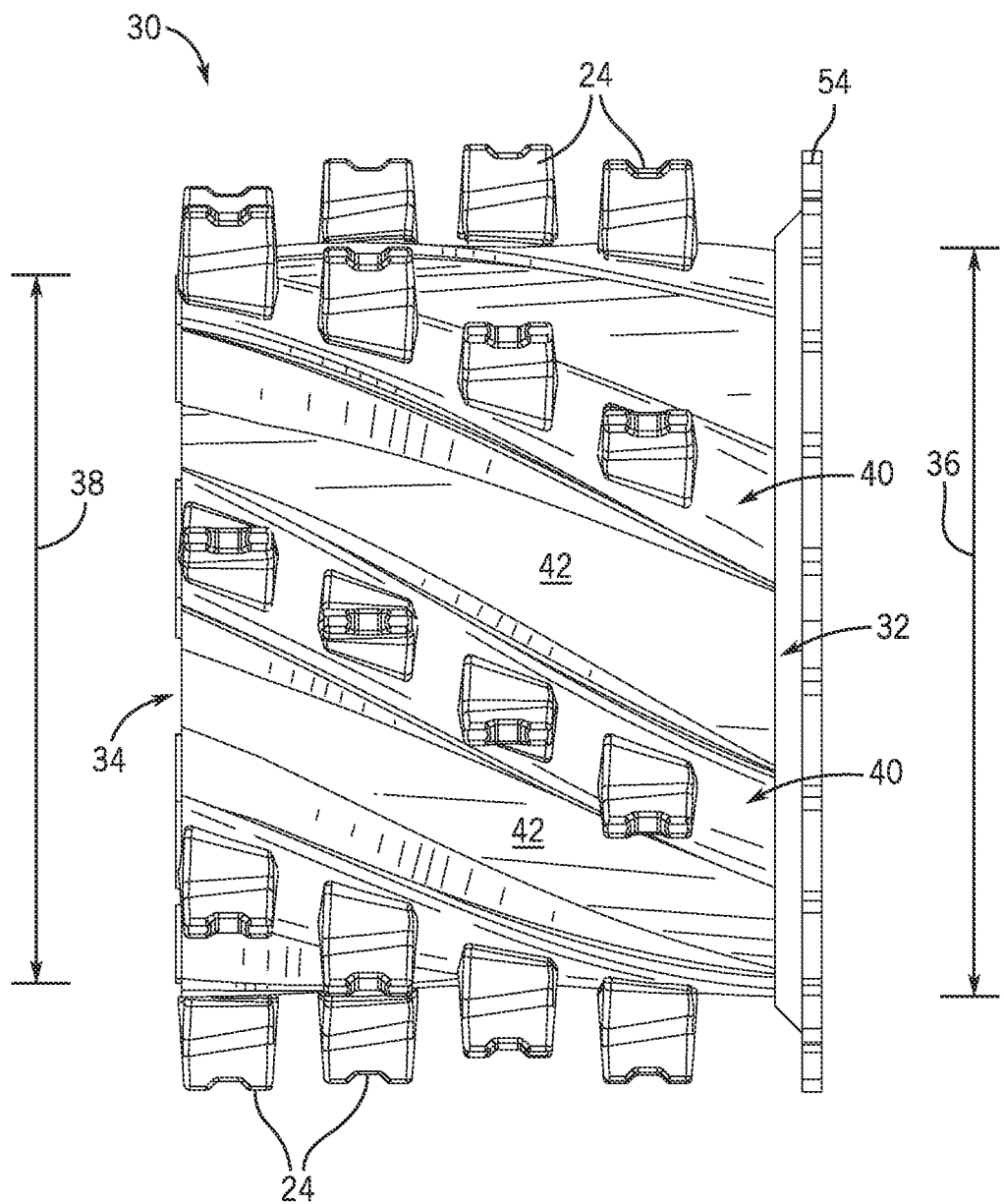
FIG. 3 is a front view of the compactor wheel of FIG. 2.

Referring now to FIGS. 2 and 3, perspective and front views of a compactor wheel 30 usable with the compaction machine 10 of FIG. 1 are provided, according to an embodiment of the invention. As previously described with respect to FIG. 1, the compactor wheel 30 includes a rim 18 mounted around a hub 16, with the rim 18 including a wrapper 20 having an outer face or surface 22 thereon. The wrapper 20 includes an inner circumferential edge 32 and an outer circumferential edge 34 that generally define the inner and outer ends of the compactor wheel 30.

As can be seen in FIG. 2, the rim 18 is constructed as a tapered rim such that the wrapper 20 has a first diameter 36 at the inner circumferential edge 32 and a second diameter 38 at the outer circumferential edge 34, with the second diameter 38 being less than the first diameter 36. The tapered rim 18 includes a plurality of cleat pads 40 formed thereon that protrude radially outward from the wrapper 20 and that extend between the inner circumferential edge 32 and the outer circumferential edge 34 of the wrapper 20. The cleat pads 40 are arranged on the wrapper 20 so as to be spaced apart from one another, such that a valley or channel 42 is formed between each adjacent pair of cleat pads 40. According to an exemplary embodiment, each cleat pad 40 extends at an angle across the wrapper 20 from the outer circumferential edge 34 to the inner circumferential edge 32 of the wrapper 20. Relative to a line extending directly from the outer circumferential edge 34 to the inner circumferential edge 32, the angle of the cleat pads 40 may, for example, be at an angle of between 30-45 degrees.

As shown in FIGS. 2 and 3, each of the cleat pads 40 is constructed to have a tapered thickness along a length thereof, with each cleat pad having a first thickness 44 at an end thereof adjacent the outer circumferential edge 34 and a second thickness 46 at an end thereof adjacent the inner circumferential edge 32, with the thickness of the cleat pad 40 being tapered down from the first thickness 44 at the outer circumferential edge 34 to the second thickness 46 at the inner circumferential edge 32. According to one embodiment, the thickness of the cleat pad 40 in the area adjacent the outer circumferential edge 34 may be 1.5 inches, tapering down to a minimal thickness in the area adjacent the inner circumferential edge 32.

The tapered thickness of the cleat pads 40 along a length thereof, in combination with the tapering of the rim between the inner circumferential edge 32 and the outer circumferential edge 34, combines to provide a compactor wheel with a uniform overall diameter at the inner circumferential edge 32 and the outer circumferential edge 34. That is, a total diameter of the rim 18 formed by the first diameter 36 of the wrapper 20 at the inner circumferential edge 32 and the thickness 46 of the plurality of cleat pads 40 thereat is equal to a total diameter of the rim 18 formed by the second diameter 38 of the wrapper 20 at the outer circumferential edge 34 and the thickness 44 of the plurality of cleat pads 40 thereat. The matching of the tapered thickness of the cleat pads 40 with the tapered diameter of the rim 18 eliminates any opposed directional traction bulge or lift in waste that is compacted, and instead provides a dimensional compactor wheel 30 that is configured to apply a consistent and static ground pressure onto a surface on which the compactor wheel 30 is translated over—with this consistent and static ground pressure aiding in forcing mud and other adhesive materials free of the wheel body.

As can be best seen in FIG. 2, each of the cleat pads 40 is generally defined by a top (i.e., outward facing) tractive surface 48, a radial facial surface 50 positioned on each of opposing sides of the top surface 48, and an end surface 52 positioned adjacent the outer circumferential edge 34 of the wrapper 20. Due to the tapered thickness of the cleat pads 40, each facial surface 50 is formed to have a generally triangular shape, with the facial surface 50 having an increased area where the thickness of the cleat pad 40 is greatest—i.e., adjacent the outer circumferential edge 34 of the wrapper 20. Accordingly, each cleat pad 40 can be described as a "chevron" type cleat pad—with the cleat pads 40 functioning to extend wear life, add beneficial static weight, and protect the integrity of the wheel body (i.e., the rim 18).

As an example of an exemplary cleat pad 40, the tractive surface 48 may be sized to have a 4 inch by 55 inch surface area that provides for increased traction and folding of refuse for the compactor wheel 30, thereby reducing fly-away paper and tightening the working face of the wrapper 20. Additionally, the leading radial facial edges 50 of the cleat pads 40 act as a cutting surface and are configured to produce high shearing ability, size reduction and extreme load bearing working-face contact pressures. Still further, the end surface 52 is formed as a flattened surface that is resistant to a snagging of waste or wire thereto.

As can be seen in FIGS. 2 and 3, the top tractive surface 48 of each cleat pad 40 includes a plurality of cleats 24 affixed thereto, with the cleats 24 being arranged along the length of the cleat pad 40 and extending radially outward therefrom. The cleats 24 may be affixed to the cleat pads 40 by welding or any other suitable technique, and may be formed so as to have an integral (one-part) construction or a two-part construction with a base member (not shown) securable to the cleat pad 40 and a cap extending radially outward from the base. By mounting the cleats 24 on the cleat pads 40, the tractive depth of the cleats 24 may be increased by 50% as compared to if they were mounted directly onto the wrapper 20. According to an exemplary embodiment, the tractive depth of the cleats 24 may thus be as great as 12.5 inches—i.e., tractive depth of the cleat 24 and cleat pad 40 combination.

While the cleat pads 40 each include an arrangement of cleats 24 thereon, the valleys 42 on the compactor wheel 30 that are formed between the cleat pads 40 are formed as cleat-free areas. These narrow, cleat-free valleys 42 between the cleat pads 40 function to constrict and hold loose debris, while allowing cohesive material to move towards the outer wheel edge, continually working to keep the compactor wheel 30 clean.

According to an exemplary embodiment, the compactor wheel 30 also includes a circumferential barrier 54 (i.e., axle guard) that extends radially out from the wrapper 20 of the rim 18 near the inner circumferential edge 32 of the wheel.

This barrier 54 can be made of any suitable material such as, for example, steel, and can extend radially out from the rim 18 to a height above, equal to, or below the cleats 24 mounted on the wheel 30. The barrier 54 may be formed as a single ring-shaped wall mounted circumferentially around the wrapper 20 of the rim 18, and it can be desirable for the ring to be supported or reinforced by some kind of buttressing structure (not shown) to, for example, help prevent the ring from being bent or knocked off during the operation of the compaction machine.

Referring now to FIGS. 4-9, perspective and front views of additional compactor wheels usable with the compaction machine 10 of FIG. 1 are provided, according to embodiments of the invention. Each of the compactor wheels shown in FIGS. 4-9, including compactor wheel 60 (FIGS. 4 and 5), compactor wheel 62 (FIGS. 6 and 7) and compactor wheel 64 (FIGS. 8 and 9), includes a rim 18 mounted around a hub 16, with the rim 18 including a wrapper 20 having an outer face or surface 22 thereon and having an inner circumferential edge 32 and an outer circumferential edge 34 that generally define the inner and outer ends of the compactor wheel.

Each of the compactor wheels 60, 62, 64 also includes cleat pads 40 formed on the wrapper similar to those described for the compactor wheel of FIGS. 2 and 3; however, the cleat pads 40 are constructed as divided cleat pads 40 that include a first pad portion 66 and a separate second pad portion 68. The first and second pad portions 66, 68 are divided by a center cleat pad 70 (i.e., center pad) formed on the wrapper 20 and encircling the wrapper circumferentially at approximately a midpoint between the inner circumferential edge 32 and the outer circumferential edge 34 of the wrapper 20, with the first pad portion 66 being positioned on the wrapper 20 between the center pad 70 and the inner circumferential edge 32 and the second pad portion 68 being positioned on the wrapper 20 between the center pad 70 and the outer circumferential edge 34. The center pad 70 extends radially outward from the wrapper 20 in a fashion similar to the cleat pad portions 66, 68, except that the center pad 70 is formed to have a constant/uniform thickness along an entire length thereof. The center pad 70 includes a plurality of cleats 24 affixed thereto that are spaced out about a length of the center pad 70, with the cleats 24 being arranged in accordance with the cleats 24 on the first and second pad portions 66, 68 or in a manner distinct therefrom.

With regard to the first pad portion 66 and second pad portion 68 of each cleat pad 40, the arrangement of the first pad portion 66 portion relative to the second pad portion 68 can vary according to embodiments of the invention. By varying the arrangement of the first pad portion 66 and the second pad portion 68 on the wrapper 20, the fraction pattern of the cleat pads 40 and cleats 24 can be set as desired by a buyer/manufacturer in order to provide a pattern most suitable for the day-to-day operation of the compaction machine on which the compactor wheels 60, 62, 64 are provided.

Figure 4:
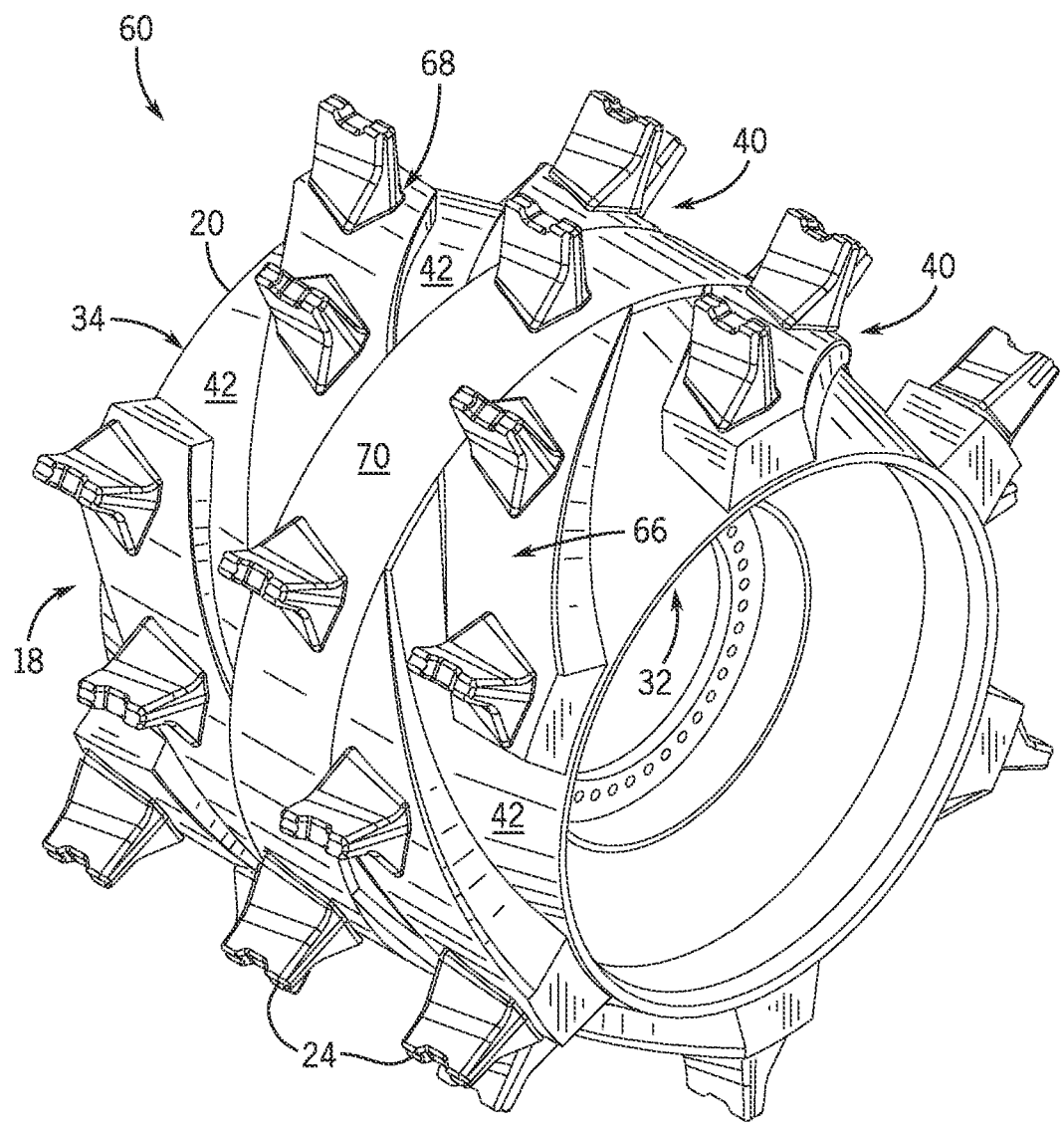
FIG. 4 is a perspective view of a compactor wheel according to an embodiment of the invention.
Figure 5:
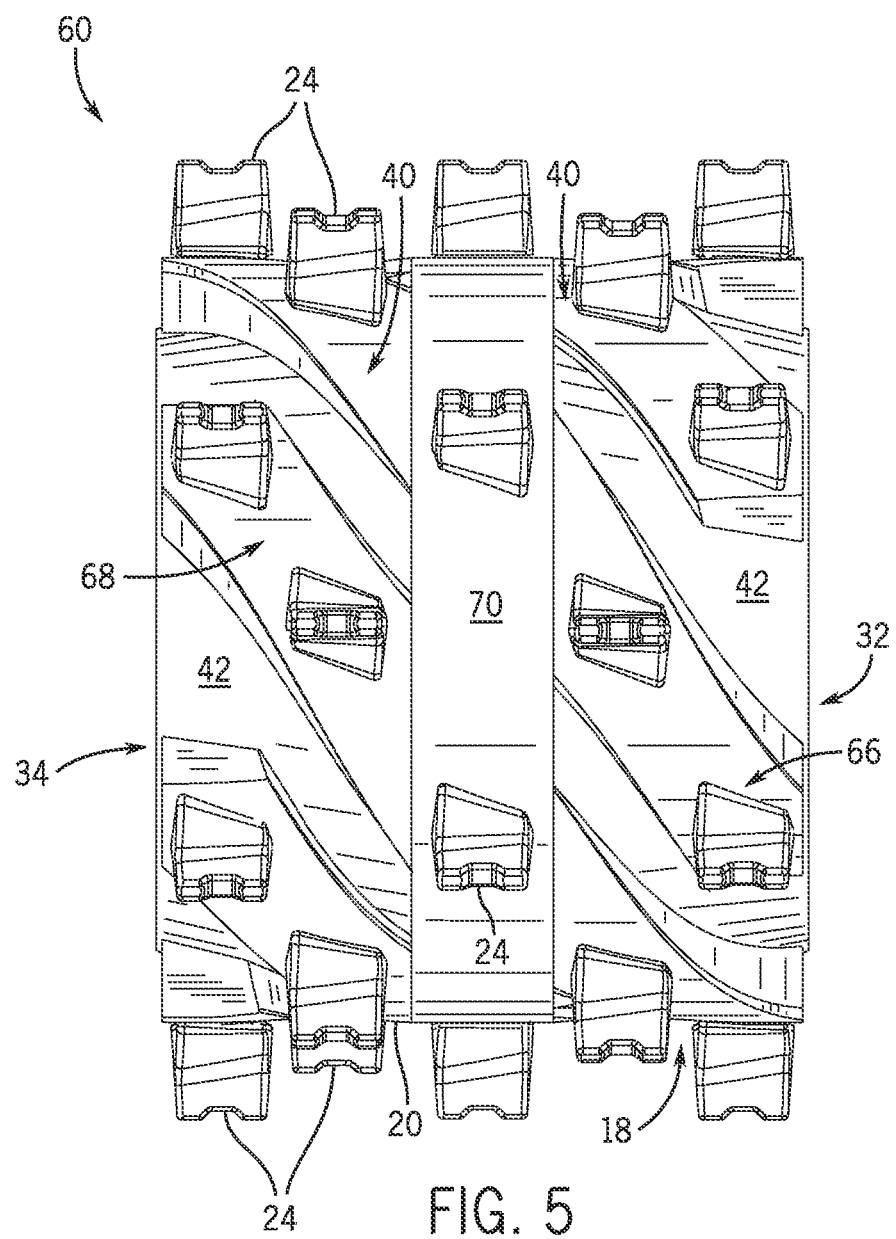
FIG. 5 is a front view of the compactor wheel of FIG. 4.

In one embodiment, and as illustrated on the compactor wheel 60 of FIGS. 4 and 5, each first pad portion 66 and its corresponding second pad portion 68 are each oriented at an identical angle on the wrapper 20 and are arranged on opposing sides of the center pad 70 in a linear fashion. Accordingly, the valleys 42 formed between adjacent first pad portions 66 and the valleys 42 formed between adjacent second pad portions 68 are also aligned on the compactor wheel 60.

Figure 6:
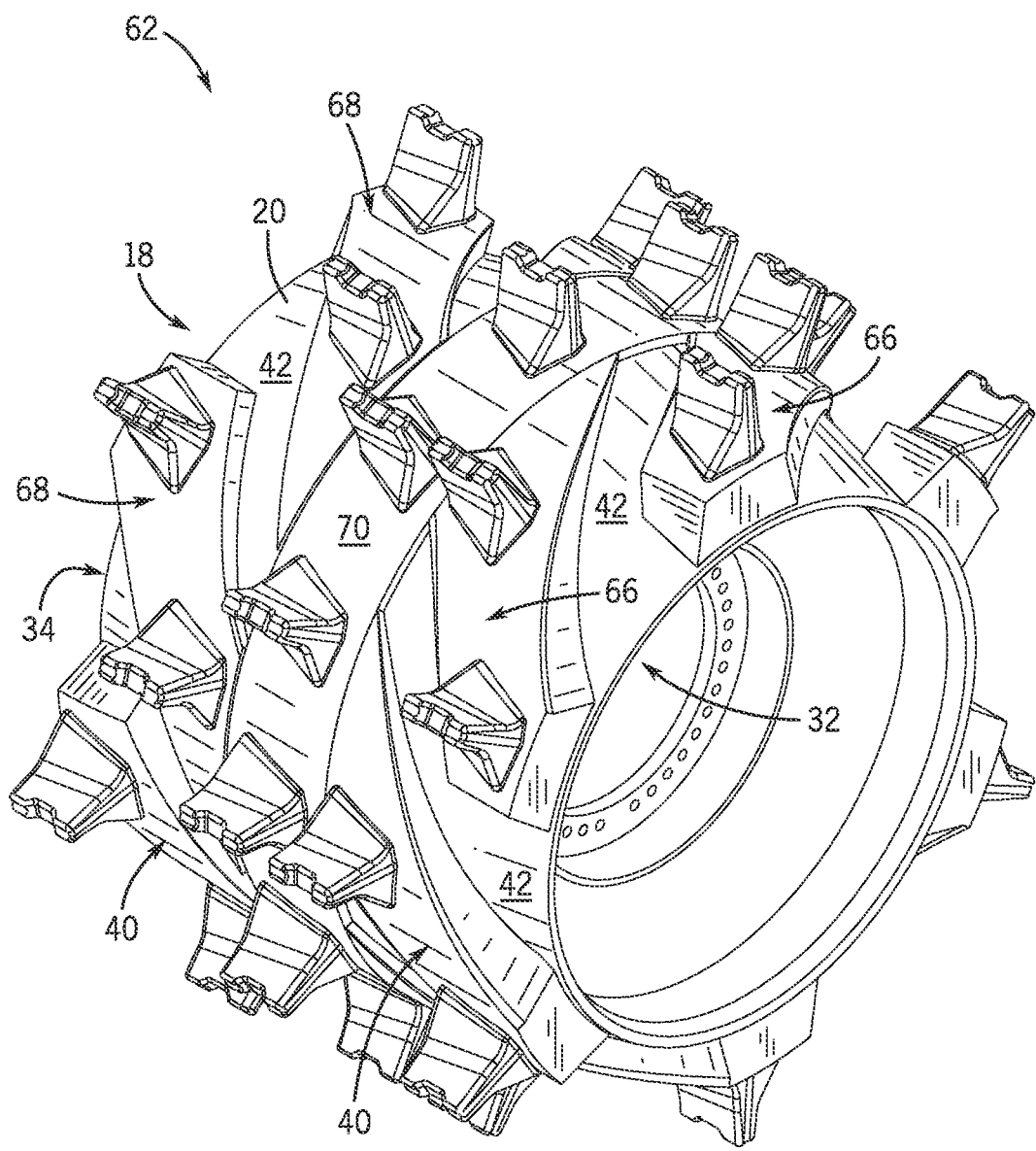
FIG. 6 is a perspective view of a compactor wheel according to an embodiment of the invention.
Figure 7:
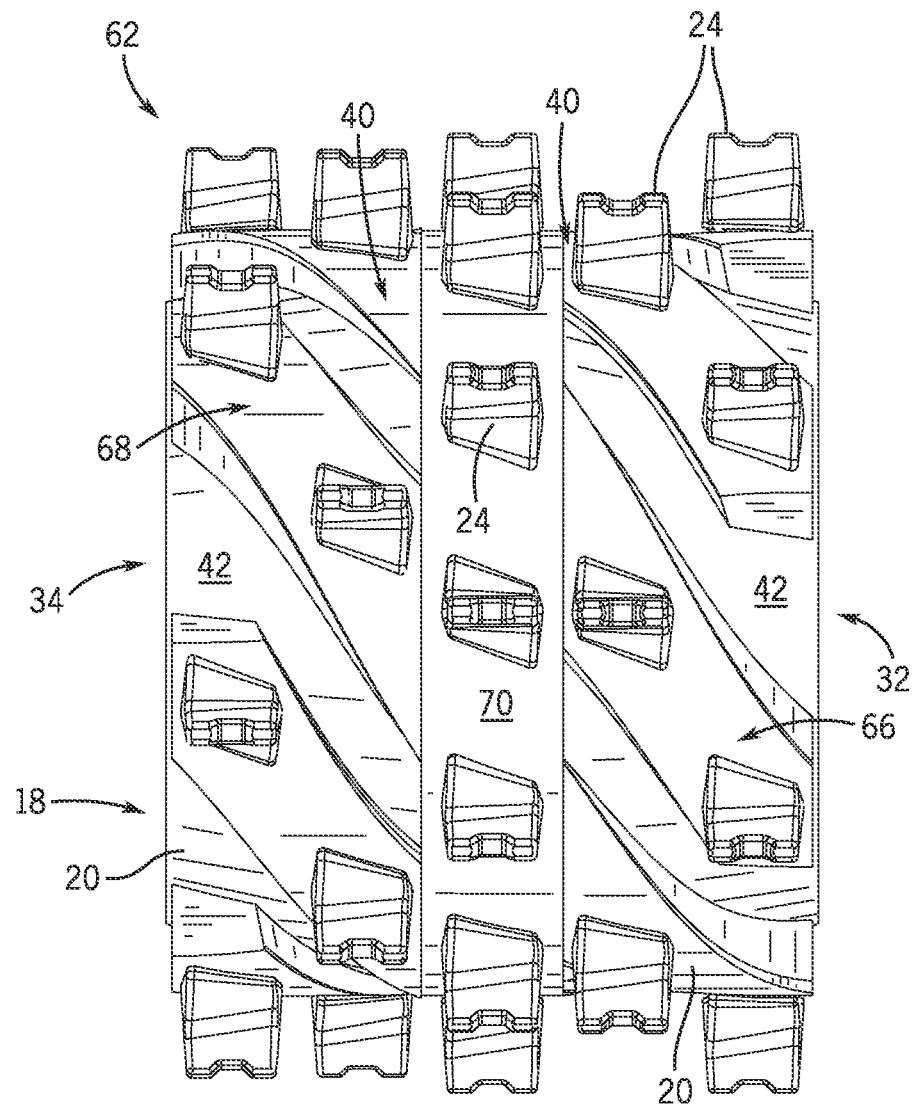
FIG. 7 is a front view of the compactor wheel of FIG. 6.

In another embodiment, and as illustrated on the compactor wheel 62 of FIGS. 6 and 7, the first pad portion 66 and its matching second pad portion 68 are each oriented at an identical angle on the wrapper 20, but are arranged on opposing sides of the center pad 70 in an offset fashion. Accordingly, the valleys 42 formed between adjacent first pad portions 66 and the valleys 42 formed between adjacent second pad portions 68 are also offset on the compactor wheel 62. As can be best seen in FIG. 7, a first pad portion 66 on the compactor wheel 62 will thus be angularly aligned with a valley 42 that is on the other side of center pad 70.

Figure 8:
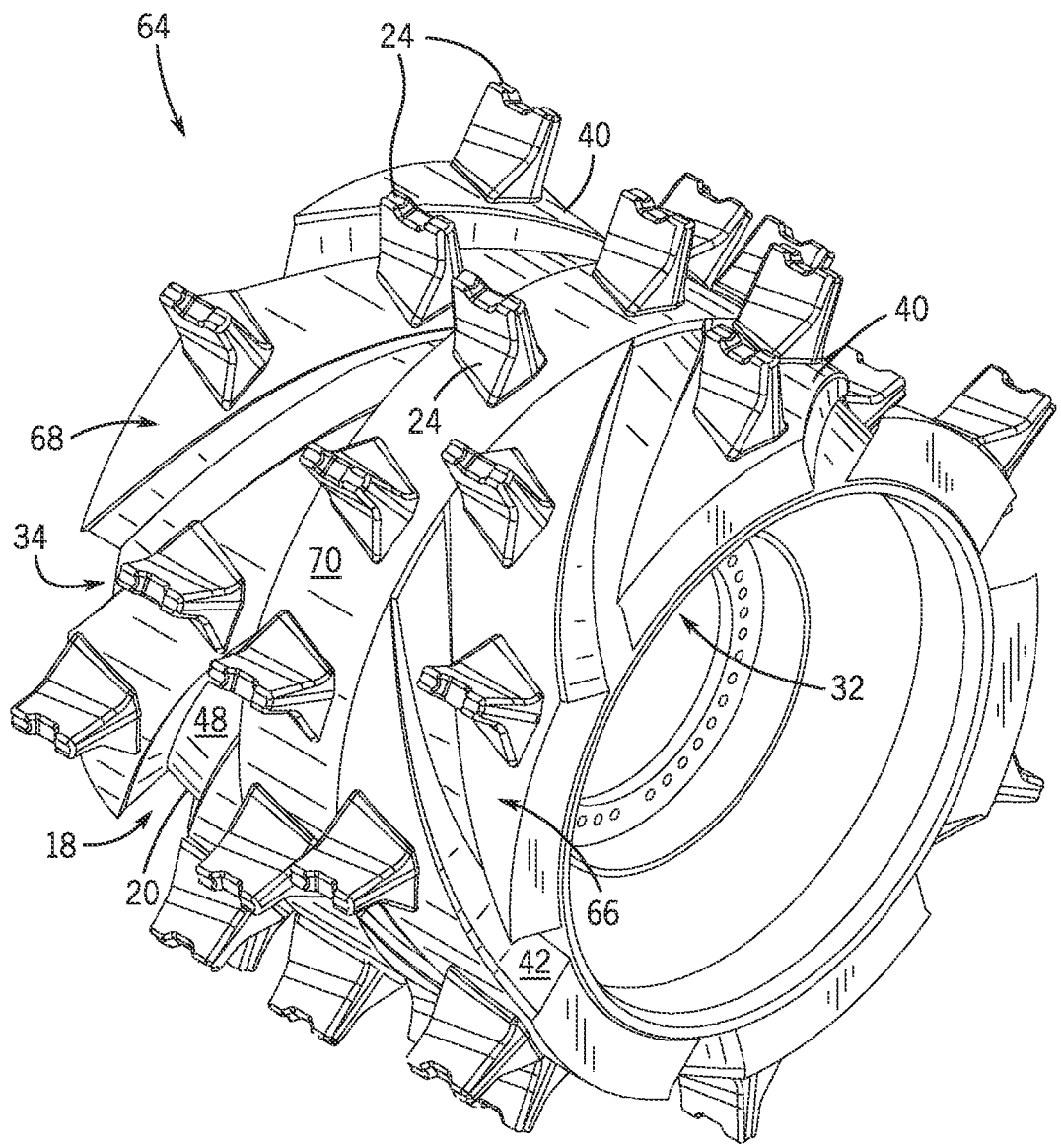
FIG. 8 is a perspective view of a compactor wheel according to an embodiment of the invention.
Figure 9:
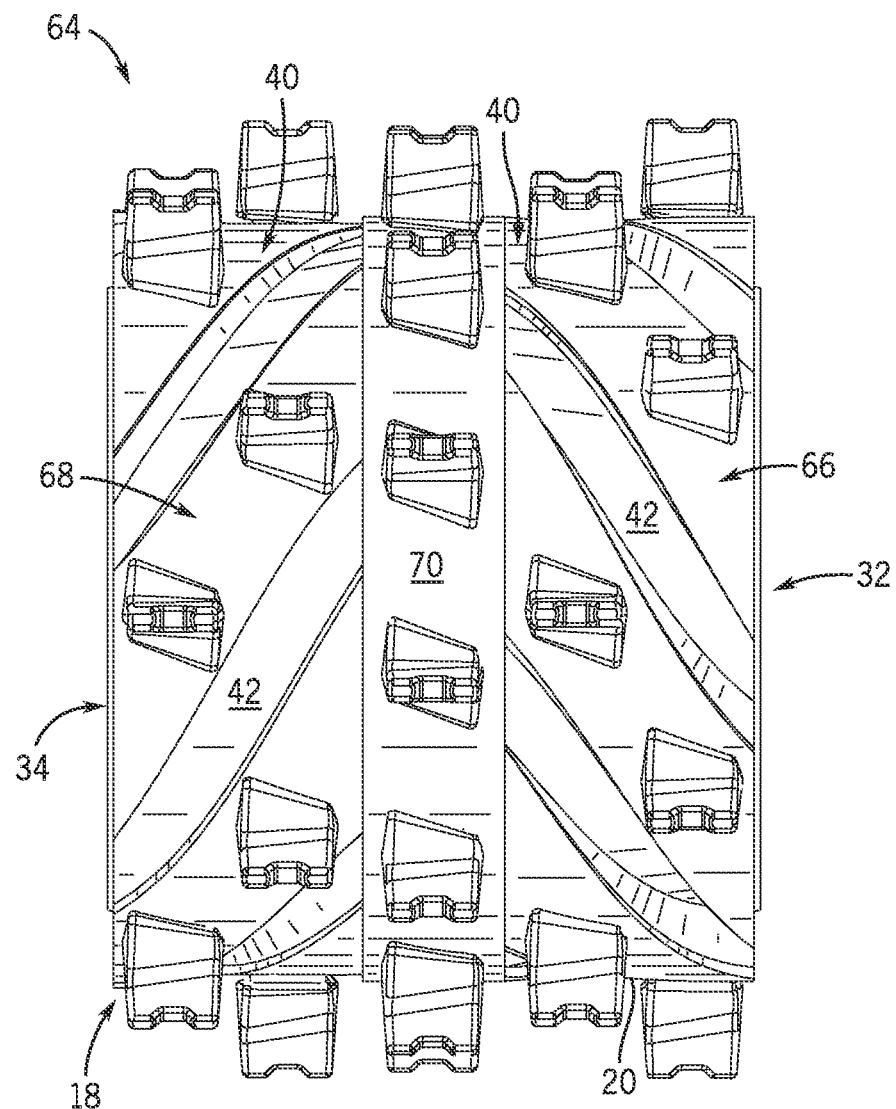
FIG. 9 is a front view of the compactor wheel of FIG. 8.

In another embodiment, and as illustrated on the compactor wheel 64 of FIGS. 8 and 9, a first pad portion 66 and its corresponding second pad portion 68 are arranged on opposing sides of the center pad 70 in a generally chevron-shaped arrangement (i.e., V-shaped arrangement). As can be best seen in FIG. 9, a first pad portion 66 and matching second pad portion 68 are arranged on opposing sides of the center pad 70 in a chevron arrangement, but are staggered in an offset fashion.

Figure 10:
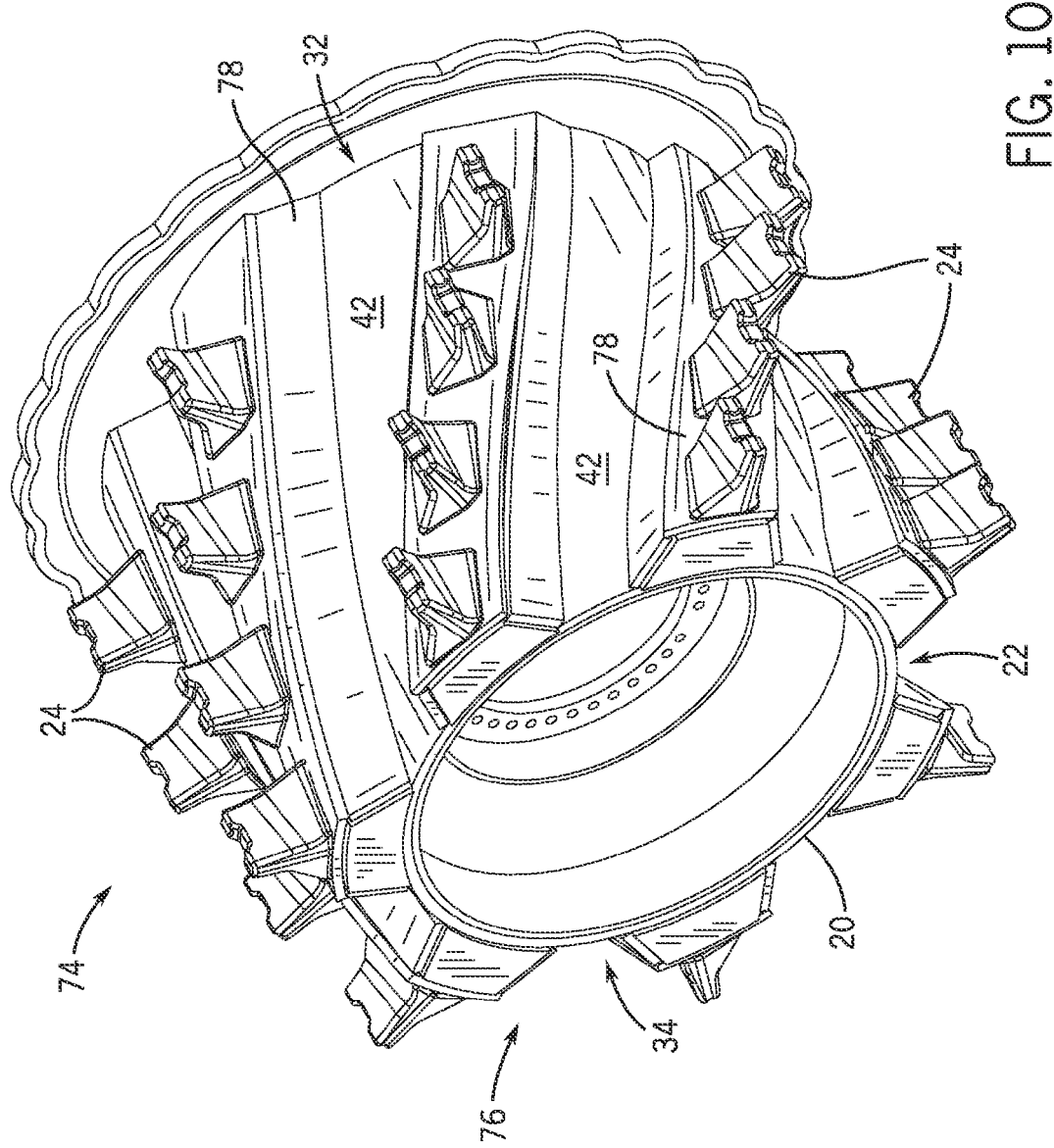
FIG. 10 is a perspective view of a compactor wheel according to an embodiment of the invention.
Figure 11:
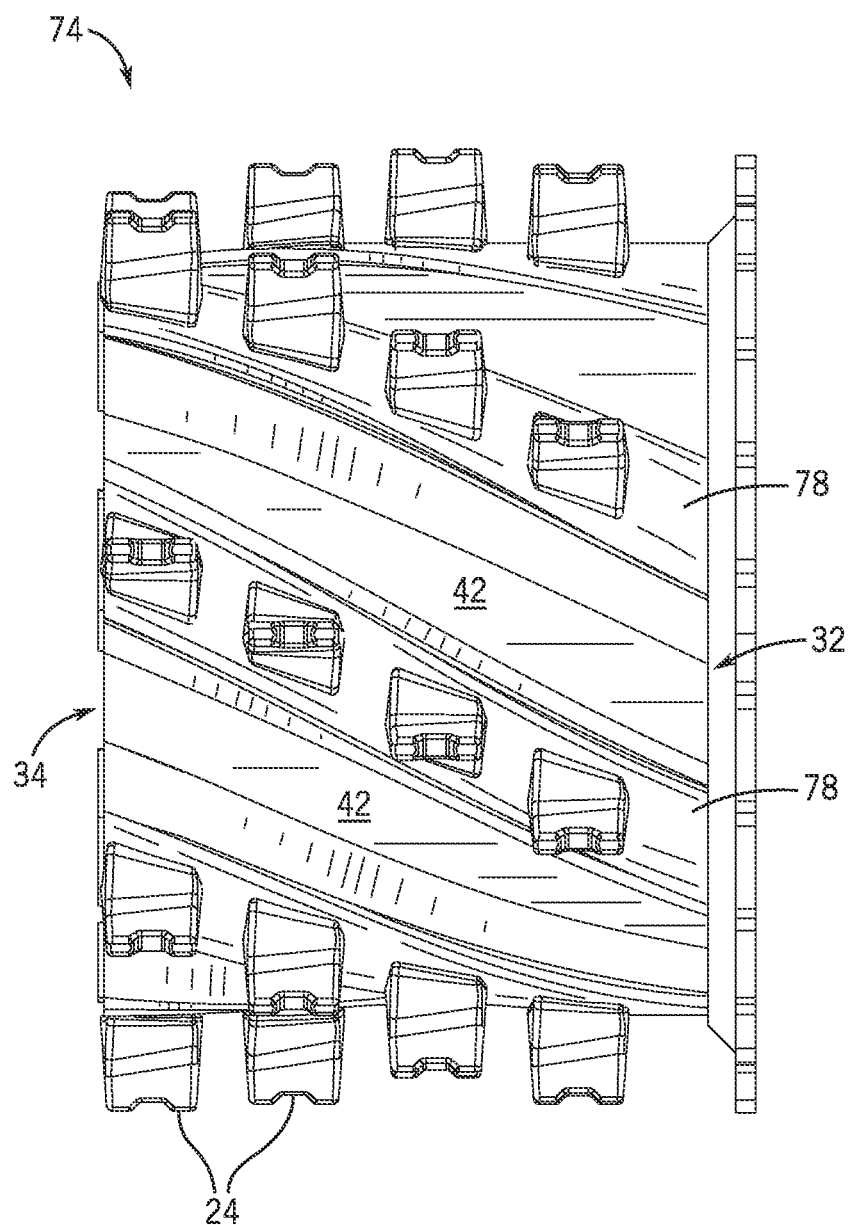
FIG. 11 is a front view of the compactor wheel of FIG. 10.

Referring now to FIGS. 10 and 11, perspective and front views of a compactor wheel 74 usable with the compaction machine 10 of FIG. 1 are provided, according to another embodiment of the invention. The compactor wheel is similar to those described prior—with the wheel including a rim 76, a wrapper 20 having an outer face or surface 22 thereon and having an inner circumferential edge 32 and an outer circumferential edge 34 that generally define the inner and outer ends of the compactor wheel, and cleat pads 78 formed on the wrapper 20. However, the compactor wheel 74 shown in FIGS. 10 and 11 is constructed as a non-tapered wheel having a fixed diameter rim 76—with the diameter of the rim 76 being reduced (as compared to a standard compactor wheel) in order to accommodate the affixing of chevron cleat pads 78 having a constant/uniform thickness thereon. The chevron cleat pads 78 extend axially outward to a raised height from the wrapper 20 (e.g., 1.5 inch thick cleat pad), with cleats 24 being welded to or otherwise mounted on the cleat pads 78.

As shown in FIGS. 10 and 11, the cleat pads 78 extend an entirety of the width of the compactor wheel 74—from the inner circumferential edge 32 of the wrapper 20 to the outer circumferential edge 34 of the wrapper 20. The cleat pads 78 therefore give the compactor wheel 74 a dimensional feature/construction for improving traction, waste size reduction, and increased compaction densities.

Beneficially, embodiments of the invention thus provide a dimensional compactor wheel having a rim with chevron cleat pads formed thereon. The rim and cleat pads provide desirable side-slope stability and maneuverability and are configured to apply a consistent and static ground pressure onto a surface on which the compactor wheel is translated over. The arrangement of cleat pads (and cleats thereon) and corresponding valleys formed on the compactor wheel act to force mud and other adhesive materials free of the wheel body (i.e., towards the outer wheel edge), while constricting and holding loose debris so as to thereby reduce fly-away paper. Accordingly, embodiments of the compactor wheel are recommended for any landfill type and are capable of handling heavy sludge intake, construction and demolition waste, municipal solid waste, high clay content, and other adhering types of evening cover materials.

Therefore, according to one embodiment of the invention, a compactor wheel mountable on an axle of a compaction machine includes a hub mountable to an axle of a compaction machine and a rim mounted around an outer circumference of the hub, with the rim including a wrapper having an inner circumferential edge and an outer circumferential edge. The compactor wheel also includes a plurality of cleat pads formed on the wrapper that each extend axially outward from the wrapper, with the plurality of cleat pads being spaced apart from one another on the wrapper such that a valley is formed between each adjacent pair of cleat pads. A plurality of cleats is affixed to each of the plurality of cleat pads and extends radially outward therefrom.

According to another embodiment of the invention, a dimensional compactor wheel includes a hub mountable to an axle of a compaction machine, a tapered rim mounted on the hub with a wrapper having an inner circumferential edge and an outer circumferential edge, and a plurality of cleat pads formed on the wrapper and each extending axially outward from the wrapper, the plurality of cleat pads being spaced apart from one another on the wrapper such that a valley is formed between each adjacent pair of cleat pads. The dimensional compactor wheel also includes a plurality of cleats affixed to each of the plurality of cleat pads and extending radially outward therefrom. Each of the plurality of cleat pads of the dimensional compactor wheel is formed so as to have a tapered thickness such that a distance which the cleat pad extends axially outward from the wrapper varies along a length of the cleat pad.

According to yet another embodiment of the invention, a dimensional compactor wheel includes a hub mountable to an axle of a compaction machine and a rim mounted on the hub that includes a wrapper formed on an outer surface of the rim, the wrapper having an inner circumferential edge and an outer circumferential edge. The dimensional compactor wheel also includes a plurality of cleat pads formed on the wrapper and each extending axially outward from the wrapper, wherein each of the plurality of cleat pads extends along the wrapper between the outer circumferential edge and the inner circumferential edge, with each cleat pad extending at angle across the wrapper from the outer circumferential edge to the inner circumferential edge. The dimensional compactor wheel further includes a plurality of cleats affixed to each of the plurality of cleat pads and extending radially outward therefrom.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compactor wheel mountable on an axle of a compaction machine, the compactor wheel comprising:
   a hub mountable to an axle of a compaction machine;
   a rim mounted around an outer circumference of the hub, the rim comprising a wrapper having an inner circumferential edge and an outer circumferential edge;
   a plurality of cleat pads formed on the wrapper and each extending axially outward from the wrapper, the plurality of cleat pads being spaced apart from one another on the wrapper such that a valley is formed between each adjacent pair of cleat pads; and
   a plurality of cleats affixed to each of the plurality of cleat pads and extending radially outward therefrom;
   wherein the rim comprises a tapered rim such that the wrapper has a first diameter at the inner circumferential edge and a second diameter at the outer circumferential edge, the second diameter being less than the first diameter; and
   wherein each of the plurality of cleat pads has a first thickness at an end thereof adjacent the outer circumferential edge and a second thickness at an end thereof adjacent the inner circumferential edge, with the thickness of the cleat pad being tapered down from the first thickness at the outer circumferential edge to the second thickness at the inner circumferential edge.

2. The compactor wheel of claim 1 wherein a total diameter of the rim formed by the first diameter of the wrapper and the second thickness of the plurality of cleat pads is equal to a total diameter of the rim formed by the second diameter of the wrapper and the first thickness of the plurality of cleat pads.

3. The compactor wheel of claim 1 wherein each of the plurality of cleat pads comprises:
   a top tractive surface on which the plurality of cleats are affixed; and
   a facial surface formed on each of opposing sides of the top tractive surface, each facial surface having a generally triangular shape formed by the tapered thickness of the cleat pad.

4. The compactor wheel of claim 1 wherein each of the plurality of cleat pads comprises an end surface positioned adjacent the outer circumferential edge of the wrapper, the end surface comprising a flattened surface that is resistant to a snagging of waste or wire thereto.

5. The compactor wheel of claim 1 wherein the valleys formed between the plurality of cleat pads comprise cleat-free areas.

6. The compactor wheel of claim 1 wherein each of the plurality of cleat pads extends along the wrapper between the outer circumferential edge and the inner circumferential edge, with each cleat pad extending at angle across the wrapper from the outer circumferential edge to the inner circumferential edge.

7. The compactor wheel of claim 1 wherein the rim further comprises a center pad formed on the wrapper and encircling the wrapper at approximately a midpoint thereof between the inner circumferential edge and the outer circumferential edge, the center pad extending radially outward from the wrapper.

8. The compactor wheel of claim 7 wherein each of the plurality of cleat pads comprises:
   a first pad portion positioned on the wrapper between the center pad and the inner circumferential edge; and
   a second pad portion positioned on the wrapper between the center pad and the outer circumferential edge.

9. The compactor wheel of claim 8 wherein:
   the first pad portion and the second pad portion are each oriented at an identical angle on the wrapper and are arranged on opposing sides of the center pad in a linear fashion;
   the first pad portion and the second pad portion are each oriented at an identical angle on the wrapper and are arranged on opposing sides of the center pad in an offset fashion; or
   the first pad portion and the second pad portion are arranged on opposing sides of the center pad in a chevron arrangement.

10. The compactor wheel of claim 1 wherein a combined height of a respective cleat pad and cleat positioned therein is up to 12.5 inches.

11. The compactor wheel of claim 1 further comprising a circumferential barrier formed around the rim at the inner circumferential edge, the circumferential barrier extending axially outward from the rim.

12. A dimensional compactor wheel comprising:
   a hub mountable to an axle of a compaction machine;
   a tapered rim mounted on the hub, the rim comprising a wrapper having an inner circumferential edge and an outer circumferential edge;

a plurality of cleat pads formed on the wrapper and each extending axially outward from the wrapper, the plurality of cleat pads being spaced apart from one another on the wrapper such that a valley is formed between each adjacent pair of cleat pads; and a plurality of cleats affixed to each of the plurality of cleat pads and extending radially outward therefrom;

wherein each of the plurality of cleat pads comprises a cleat pad having a tapered thickness such that a distance which the cleat pad extends axially outward from the wrapper varies along a length of the cleat pad.

13. The compactor wheel of claim 12 wherein the tapered thickness of each of the plurality of cleat pads is matched with the tapered rim such that the dimensional compactor wheel is configured to apply a consistent and static ground pressure onto a surface on which the compactor wheel is translated over.

14. The compactor wheel of claim 12 wherein each of the plurality of cleat pads comprises:

an outward facing tractive surface on which the plurality of cleats are affixed; and a facial surface formed on each of opposing sides of the outward facing tractive surface, each facial surface having a generally triangular shape formed by the tapered thickness of the cleat pad.

15. The compactor wheel of claim 12 wherein each of the plurality of cleat pads extends along the wrapper between the outer circumferential edge and the inner circumferential edge, with each cleat pad extending at angle across the wrapper from the outer circumferential edge to the inner circumferential edge.

16. The compactor wheel of claim 15 wherein each of the plurality of cleat pads is angled on the wrapper so as to be in parallel with the others of the plurality of cleat pads.

17. The compactor wheel of claim 12 wherein the valleys formed between the plurality of cleat pads comprise cleat-free areas.

18. A compactor wheel mountable on an axle of a compaction machine, the compactor wheel comprising:

a hub mountable to an axle of a compaction machine;

a rim mounted around an outer circumference of the hub, the rim comprising a wrapper having an inner circumferential edge and an outer circumferential edge;

a plurality of cleat pads formed on the wrapper and each extending axially outward from the wrapper, the plurality of cleat pads being spaced apart from one another on the wrapper such that a valley is formed between each adjacent pair of cleat pads; and a plurality of cleats affixed to each of the plurality of cleat pads and extending radially outward therefrom;

wherein the rim further comprises a center pad formed on the wrapper and encircling the wrapper at approximately a midpoint thereof between the inner circumferential edge and the outer circumferential edge, the center pad extending radially outward from the wrapper.

* * * * *

UNITED STATES PATENT AND TRADEMARK OFFICE
CERTIFICATE OF CORRECTION

| | |
|---|---|
| PATENT NO. | : 9,365,996 B2 |
| APPLICATION NO. | : 14/514490 |
| DATED | : June 14, 2016 |
| INVENTOR(S) | : Brockway |

It is certified that error appears in the above-identified patent and that said Letters Patent is hereby corrected as shown below:

On the Title Page

Item (57), line 3, delete "fly-away is disclosed." and substitute therefore -- fly-away. --.

In the Specification

Col. 5, line 50, delete "fraction pattern" and substitute therefore -- traction pattern --.

Signed and Sealed this
Twenty-third Day of August, 2016

Michelle K. Lee
*Director of the United States Patent and Trademark Office*